Figure 1:
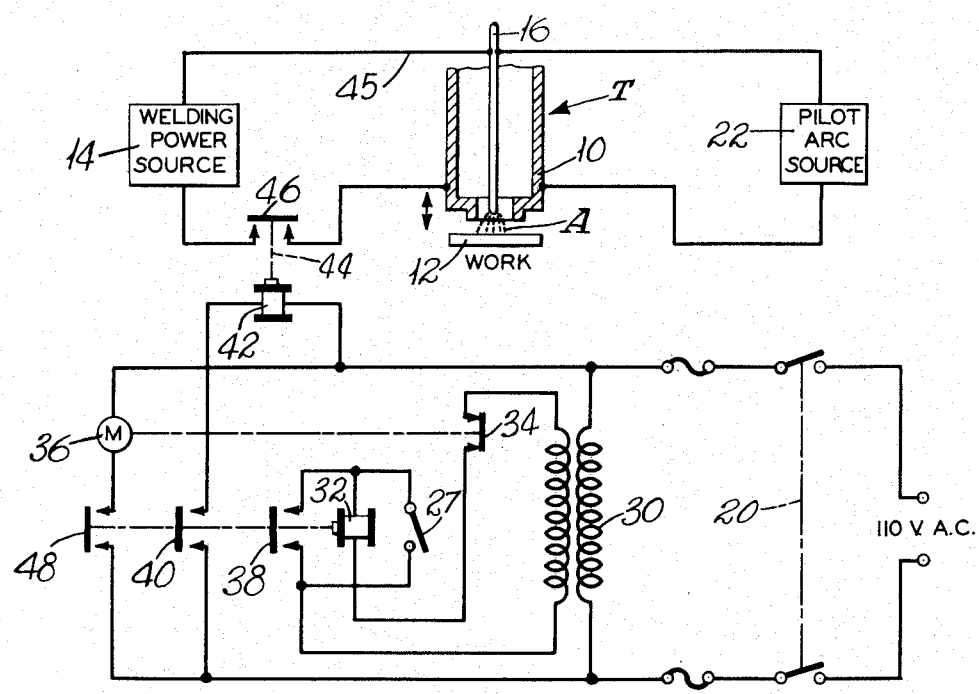

Sept. 26, 1961 R. P. SULLIVAN 3,002,084
ELECTRIC ARC WORKING
Filed Jan. 28, 1959

INVENTOR.
RAYMOND P. SULLIVAN
BY
Barnwell A. King
ATTORNEY 3,002,084
ELECTRIC ARC WORKING
Raymond P. Sullivan, Jersey City, N.J., assignor to Union Carbide Corporation, a corporation of New York
Filed Jan. 28, 1959, Ser. No. 789,575
8 Claims. (Cl. 219—127)

This invention relates to electric working and more particularly to work-in-circuit arc welding.

The invention involves establishing a temporary surface-to-surface electrical ground contact between the work to be welded and a contact member in the welding circuit, adjacent the site to be welded, for at least the duration of the welding operation, by moving such contact member into such surface-to-surface contact with the work as a welding electrode in such circuit is advanced toward such welding site, and conducting welding current through such surface-to-surface contact between said member and such work for the duration of the welding operation.

Conventionally, in gas-shielded arc spot welding two power supply cables are connected, one to the electrode and one to the workpiece. The principal problem is that a physical change of the ground cable to each new workpiece has been necessary heretofore. Furthermore, attachment of the ground cable to small pieces is difficult.

According to the present invention, however, there is no conventional ground connection to the workpiece at all. Instead, the ground connection is in the welding torch itself. Thus, when the torch nozzle is in contact with the workpiece, the ground path of the welding circuit to the latter is completed.

The invention is applicable to either non-consumable or consumable electrode gas-shielded arc spot welding. For the former, pilot-arc starting is recommended; for the latter, no such auxiliary apparatus is required.

Both manual and mechanized operations are improved by use of the invention. For example, this grounding system is now installed on a steel-billet-tagging machine. Another contemplated use is on fixtures for welding complex aircraft and missile structures.

Novel advantages are: (1) the weldment does not have to carry welding current in that such welding current would be independent of either the weldment or the welding fixture, and (2) any electronic or electrical apparatus on the welding fixture would not be subject to damage from welding current, as at present.

An important object of this invention is to provide a new arc spot-welding circuit for either A.C. or D.C., the principal circuit consideration being the method of grounding. Such circuit is applicable in virtually all gas-shielded arc spot-welding processes.

Another object is to provide an improved circuit for non-consumable electrode spot welding incorporating what is now called "pilot-arc" starting.

"Pilot-arc" starting was developed to avoid certain disadvantages sometimes found with prior high-frequency starting in gas-shielded non-consumable electrode arc welding.

The pilot arc and the pilot flame of a gas stove serve analogous purposes. That is, the pilot flame of a gas stove operates continuously for the purpose of igniting the main flame. In like manner, the pilot arc of a welding torch is established as a low-current auxiliary arc between the electrode and some other point, such as the cup itself, so as to provide an ionized path continuously between the electrode and the work, so that the welding arc will be instantly formed when the welding contactor is closed.

In the gas-shielded non-consumable electrode arc welding process, several methods of arc initiation are applicable: (1) high frequency, (2) pilot arc, or (3) mechanical retract.

*General advantages of "pilot-arc" starting*

(1) When used for mechanized welding, "pilot-arc" starting simplifies installation requirements and eliminates the cost of high-frequency generators and shielding against high-frequency radiation.

(2) The reduced output of prior high-frequency equipment and the loss through shielding capacitance indicates that pilot-arc ignition is preferred for positive starting.

(3) Unlike high-frequency starting, "pilot-arc" starting imposes no limit on torch cable length.

(4) With "pilot-arc" starting, metal nozzles or cups can be used in all applications. When using high-frequency, ceramic cups may be required, particularly in certain manual welding applications.

(5) With "pilot-arc" starting, the main electrode remains at a constant temperature. The electrode dimensions thus remain the same and more uniform spot welds result. In mechanized welding applications, there is less danger of electrode growth causing the arc length to shorten as the weld progresses.

(6) Light from the pilot arc is sufficiently intense so that the weldment can be seen through the filter glass of a welding helmet; thus, an arc can be struck at a precise point with ease.

The conventional method of gas-shielded arc spot welding, as pointed out above, is to attach two cables from a suitable power supply, one of which goes to the electrode and the other to the workpiece. Particularly in manual spot welding, such system offers two disadvantages:

(1) To go from one workpiece to another requires the physical change of the ground cable from one to the other.

(2) When spot welding small pieces, it is sometimes difficult to attach the ground cable to the work.

In the method and apparatus of the invention, there is, apart from the welding torch itself, no ground connection to the workpiece. Instead, a ground connection is provided in the welding torch; thus when the nozzle of the welding torch contacts the workpiece, the cup as it contacts the workpiece brings the workpiece into the ground section of the welding circuit.

The invention provides an arc working process which comprises establishing flow of gas through a torch including a nozzle and an electrode spaced to provide an outlet for such gas, energizing a pilot arc in the space between such electrode and nozzle, applying the end of said nozzle to a workpiece, transferring such pilot arc to the workpiece, and energizing a working arc between the end of said electrode and such workpiece within said nozzle by electric current that flows through the contact between said nozzle and such workpiece.

Figure 2:
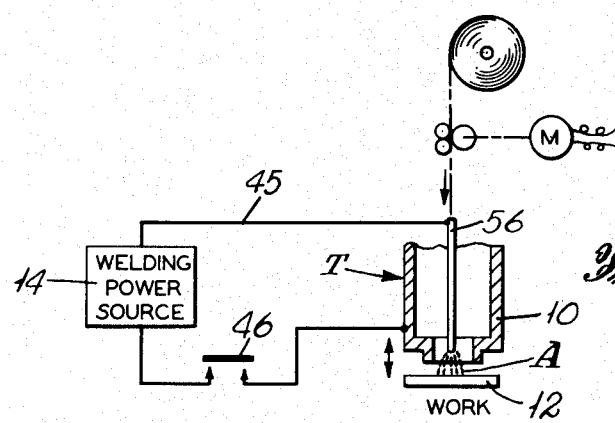

In the drawings:

FIG. 1 is a simplified circuit diagram of a gas-shielded non-consumable electrode arc welding system illustrating the invention; and FIG. 2 is a similar view of a consumable electrode modification.

It is to be noted from FIG. 1 and the description of operation that follows that nozzle or cup 10 of torch T does not carry welding current unless the rim of such cup is in contact with the work 12; and until such time as the torch trigger in the case of manual operation, or a limit switch in the case of mechanized operation, is closed. At that point current flows from welding power supply 14 to electrode 16 through the welding arc A to the work, through the cup and back to the welding power supply. It should be noted, then, that a main welding arc is never struck between the cup and the work.

Significant novelty of the invention resides in providing a ground connection in the welding torch, thereby eliminating the need for any other ground connection to the workpiece. This makes it very simple for an operator to move from workpiece to workpiece without attaching a ground cable to each workpiece as in the past.

Referring again to FIG. 1 of the attached drawing, in order to initiate a spot-welding operation, assuming a suitable arc shielding gas, such as argon, is flowing through the torch T:

(1) Main line switch 20 is closed.

(2) A pilot arc is ignited in the space between electrode 16 and cup 10. Potential for such pilot arc is supplied by an auxiliary pilot-arc source 22.

(3) The torch T is advanced toward the work 12.
  A. Cup 10 touches the work.
  B. Cup and work are at the same potential.

(4) Pilot arc transfers to the work.
  A. Work is in closer proximity to electrode than cup.

(5) Trigger switch or limit switch 27 is closed (trigger switch is used on manual setup, limit switch is used on mechanized setup).
  A. Twenty-eight volts A.C. is supplied momentarily across the trigger switch from transformer 30.

(6) Pilot relay 32 is energized through normally closed contacts 34 associated with timer motor 36.

(7) A first set of contacts 38 of such pilot relay closes, locking in coil of pilot relay 32. A second set of contacts 40 of such pilot relay closes, energizing coil 42 of welding contactor 44, which in turn closes contacts 46 of said welding contactor, thereby closing a circuit 45 from welding power supply 14 to the electrode, to the work, to the cup, through the closed welding contactor back to the welding power supply. A third set of contacts 48 of pilot relay closes and starts the timer motor.

(8) Timer motor times out and opens the contacts 34 at the end of the spot-welding cycle.

(9) When the contacts 34 open, pilot relay 32 is unlocked and drops out, which in turn opens the welding contactor 44 and also returns the timer 36 to zero.

Where a gas-shielded consumable metal arc spot-welding process is used, the pilot-arc circuit of FIG. 1 and the components thereof are eliminated (see FIG. 2). Arc initiation is effected easily by the high current density flashing off the end of wire electrode 56 as it strikes the workpiece 12.

In summary the invention has the following three principal advantages:

(1) Eliminates the need to change cables from one workpiece to another.

(2) Facilitates the spot welding of small pieces.

(3) Eliminates any chance of a high resistance ground.

What is claimed is:

1. Work-in-circuit arc welding which comprises establishing a temporary surface-to-surface electrical ground contact between the work to be welded and an annular contact member in the arc welding circuit, adjacent the site to be welded, for a least the duration of the arc welding operation, by moving such annular contact member into such surface-to-surface contact with the work as an arc welding electrode in such circuit is advanced toward such welding site, and conducting arc welding current through such surface-to-surface contact between said member and such work for the duration of the welding operation, while flowing an annular stream of arc shielding gas through said annular member and around the end of said arc welding electrode.

2. Arc working process which comprises establishing flow of gas through a torch including a nozzle and an electrode spaced to provide an outlet for such gas, energizing a pilot arc in the space between such electrode and nozzle, applying the end of said nozzle to a workpiece, transferring such pilot arc to the workpiece, and energizing a working arc between the end of said electrode and such workpiece within said nozzle by electric current that flows through the contact between said nozzle and such workpiece.

3. Electric arc welding which comprises conducting the arc welding current to a workpiece through a contact member adjacent a nozzle surrounding a welding electrode by contacting the end of such member with the workpiece, in which a pilot arc is first struck between such electrode and said contact member.

4. A circuit for conducting arc welding current to a workpiece, which comprises an arc torch provided with an arc welding electrode and a gas cup having a work surface-to-surface ground contact rim through which the welding current flows directly to such workpiece during the welding operation, and means for connecting said torch to a source of welding current comprising power cables connected to said cup and electrode, respectively.

5. A circuit as defined by claim 4, including switching means for closing and opening such circuit when said ground contact rim is in contact with the workpiece for controlling flow of welding current through said cables in such circuit.

6. Arc welding process which comprises establishing flow of gas through a torch including a nozzle and an electrode spaced to provide an outlet for such gas, applying the end of said nozzle to a workpiece, and energizing a welding arc between the end of said electrode and such workpiece within said nozzle by electric arc welding current that flows through the contact between said nozzle and such workpiece 7. Process as defined by claim 6 in which such electrode is fed toward such arc as the end of the electrode is consumed within such gas flow.

8. Process as defined by claim 6 in which the end of such electrode is fixed during the arc welding operation within such gas flow.

References Cited in the file of this patent

UNITED STATES PATENTS

| | | |
|---|---|---|
| 2,045,523 | Fassler | June 23, 1936 |
| 2,516,016 | Pakala | July 18, 1950 |
| 2,683,791 | Ruehlemann et al. | July 13, 1954 |
| 2,806,124 | Gage | Sept. 10, 1957 |
| 2,874,264 | Quinlan | Feb. 17, 1959 |